United States Patent
Bialer et al.

(10) Patent No.: US 11,693,091 B2
(45) Date of Patent: Jul. 4, 2023

(54) RADAR DETECTION AND PARAMETER ESTIMATION OF ACCELERATING OBJECTS

(71) Applicant: GM GLOBAL TECHNOLOGY OPERATIONS LLC, Detroit, MI (US)

(72) Inventors: Oded Bialer, Petah Tivak (IL); Amnon Jonas, Jerusalem (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 242 days.

(21) Appl. No.: 17/135,345

(22) Filed: Dec. 28, 2020

(65) Prior Publication Data

US 2022/0206112 A1 Jun. 30, 2022

(51) Int. Cl.
*G01S 7/41* (2006.01)
*G01S 7/295* (2006.01)
*G01S 13/931* (2020.01)

(52) U.S. Cl.
CPC .............. *G01S 7/415* (2013.01); *G01S 7/295* (2013.01); *G01S 7/418* (2013.01); *G01S 13/931* (2013.01)

(58) Field of Classification Search
None
See application file for complete search history.

(56) References Cited

U.S. PATENT DOCUMENTS

| 2008/0174475 | A1 | 7/2008 | Clark |
| 2009/0027255 | A1* | 1/2009 | Stove ................. G01S 13/5246 342/93 |
| 2015/0177303 | A1* | 6/2015 | Ebling ................. G01S 13/931 342/27 |
| 2021/0011146 | A1 | 1/2021 | Bialer et al. |

OTHER PUBLICATIONS

Xiao; Parameter estimation of accelerating target based on direct phase differentiation method in LFMCW radar; IEEE Internation Conference on Information and Automation; China, 2008, 6 pages.

* cited by examiner

*Primary Examiner* — Whitney Moore
(74) *Attorney, Agent, or Firm* — Cantor Colburn LLP

(57) ABSTRACT

A system for estimating a parameter of an object includes a receiver configured to detect a return signal of a radar signal, and a processing device configured to sample the return signal to generate a series of signal samples, partition a time frame into a plurality of successive segments k, and for each segment k, apply a Doppler Fourier transform and calculate a complex value $y_k$ as a function of Doppler frequencies $f_D$. The processing device is also configured to calculate an index based on an acceleration hypothesis and a velocity hypothesis of a set of hypotheses, and for each segment, select one or more Doppler frequency bins based on the index and extract components of the complex value $y_k(f_D)$ associated with each selected Doppler frequency bin. The processing device is further configured to calculate a velocity and acceleration spectrum, and estimate an object parameter based on the spectrum.

20 Claims, 6 Drawing Sheets

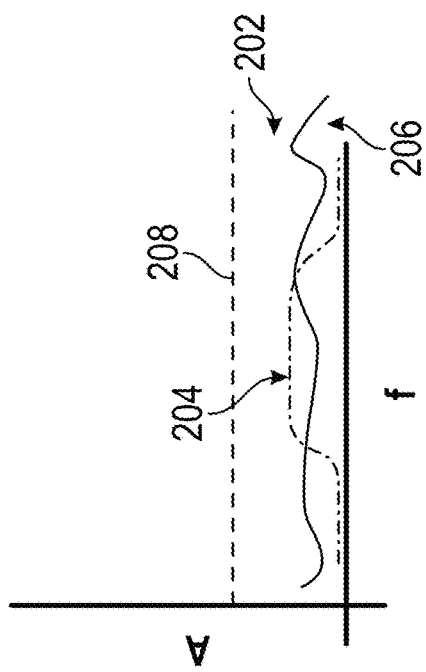
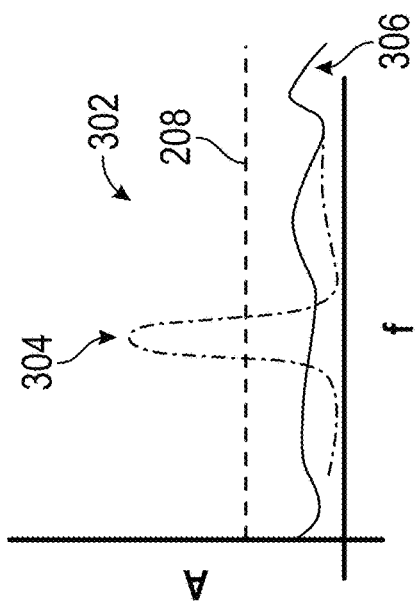
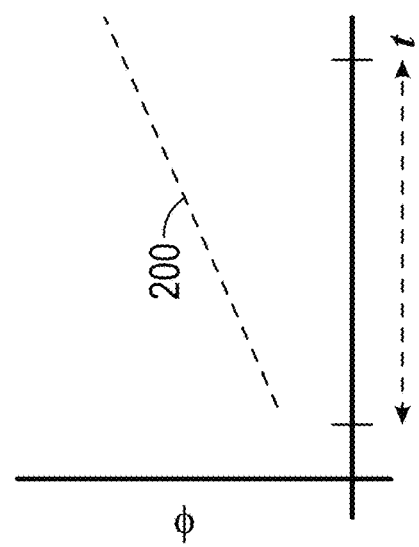
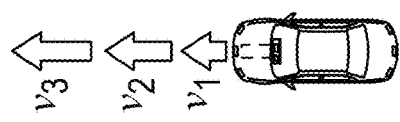
FIG. 6
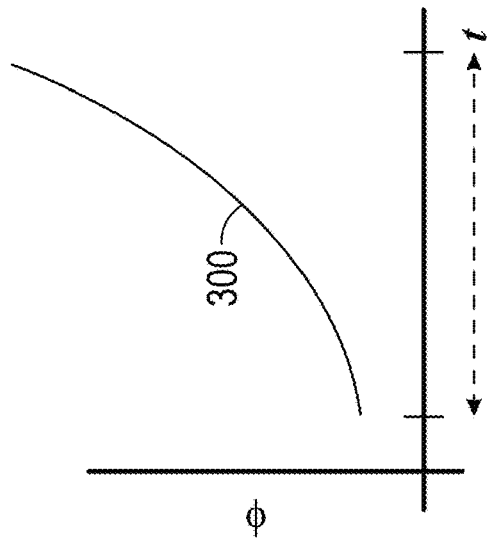
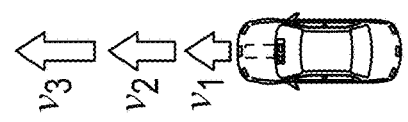
FIG. 7

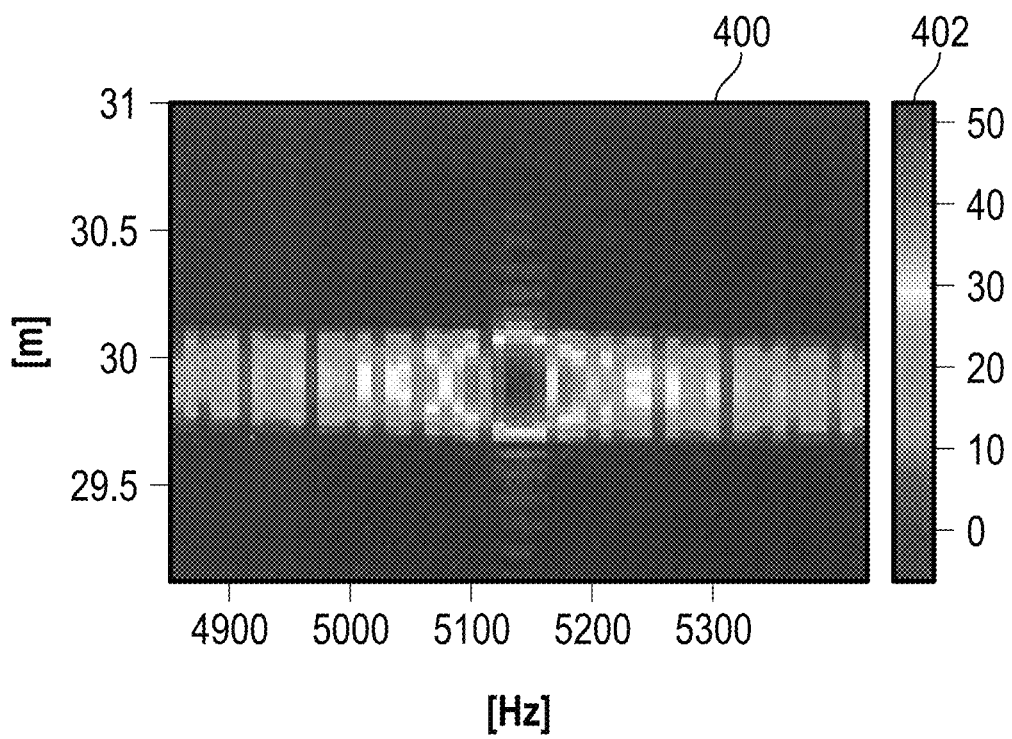
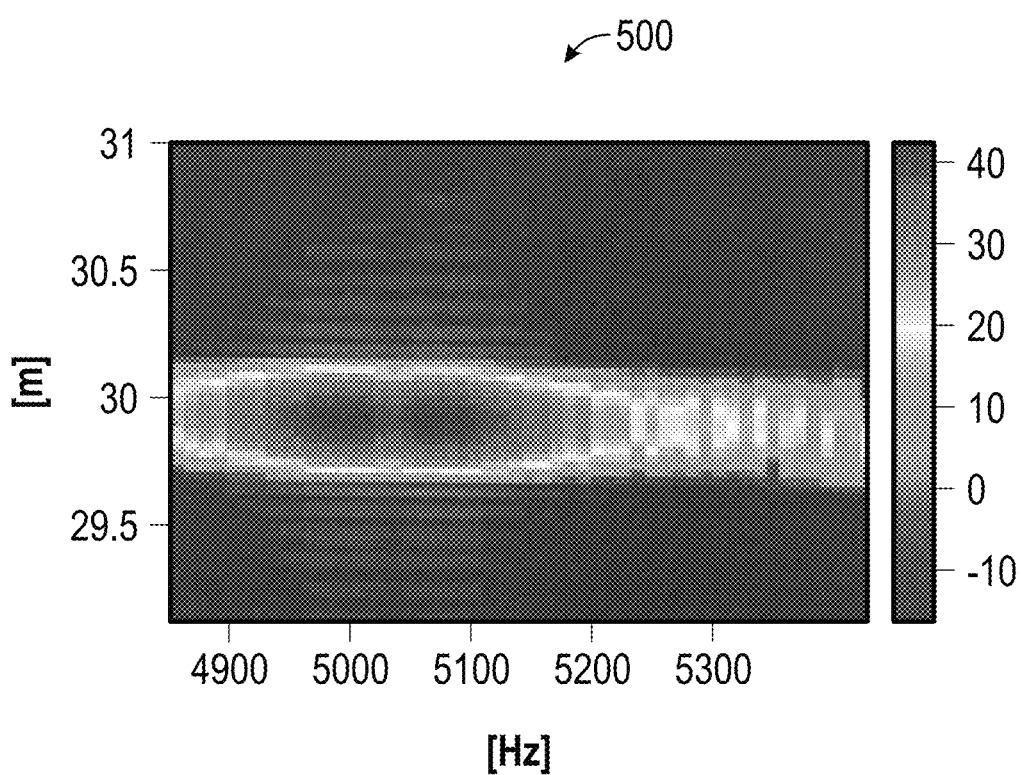
FIG. 8

RADAR DETECTION AND PARAMETER ESTIMATION OF ACCELERATING OBJECTS

INTRODUCTION

The subject disclosure relates to estimation of object position and movement using radar.

Vehicles (e.g., automobiles, trucks, aircraft, construction equipment, farm equipment, automated factory equipment) are increasingly equipped with detection systems for monitoring surrounding environments. Radar systems may be used for detection and tracking of objects, for example, to avoid obstacles. Radar systems may be used in vehicles to alert a driver or user and/or to take evasive action. Detection and tracking systems are also useful in autonomously operated vehicles. The position of a moving object may not be detected accurately through conventional radar processing within typical integration times, especially if the object is accelerating. Accordingly, it is desirable to provide a system for accurate position estimation of an accelerating object using radar.

SUMMARY

In one exemplary embodiment, a system for estimating a parameter of an object includes a receiver configured to detect a return signal including reflections of a radar signal, the radar signal including a series of transmitted pulses emitted over a selected time frame. The system also includes a processing device configured to sample the return signal over the time frame to generate a series of signal samples, partition the time frame into a plurality of successive segments k so that an assumption of a linear phase change within each segment k is valid, and for each segment k, apply a Doppler Fourier transform and calculate a complex value $y_k$ as a function of a plurality of Doppler frequencies $f_D$. The processing device is also configured to select a set of hypotheses including an acceleration hypothesis and velocity hypothesis, and for the set of hypotheses, calculate an index based on the acceleration hypothesis and the velocity hypothesis, and for each segment, select one or more Doppler frequency bins based on the index and extract components of the complex value $y_k(f_D)$ associated with each selected Doppler frequency bin. The processing device is further configured to combine the extracted components to calculate a velocity and acceleration spectrum for the time frame, and detect the object and estimate an object parameter based on the velocity and acceleration spectrum.

In addition to one or more of the features described herein, the object parameter includes at least one of an object position, an object velocity and an object acceleration.

In addition to one or more of the features described herein, the processing device is configured to detect the object based on an intensity of the velocity and acceleration spectrum exceeding a selected threshold.

In addition to one or more of the features described herein, the processing device is configured to select a plurality of sets of hypotheses, each set of hypotheses having a respective velocity hypothesis and a respective acceleration hypothesis.

In addition to one or more of the features described herein, the processing device is configured to calculate a respective index for each set of hypotheses, generate a velocity and acceleration spectrum for each set of hypotheses based on the respective index, estimate a velocity and acceleration of the object by comparing intensities of each respective velocity and acceleration spectrum, and select at least one of the velocity and acceleration spectra based on the comparing.

In addition to one or more of the features described herein, the set of hypotheses includes an initial velocity hypothesis $\hat{v}_0$ and an acceleration hypothesis $\hat{\alpha}$, and calculating the index includes calculating a velocity value for each segment k based on:

$$\tilde{v} = \hat{v}_0 + \hat{\alpha}kMT,$$

where $\tilde{v}$ is the Doppler index, M is a number of samples in each segment k, and T is a sampling interval, converting the velocity value for each segment k to a Doppler frequency based on:

$$f_D = \frac{2\tilde{v}}{\lambda},$$

where $\lambda$ is a wavelength, and selecting at least one Doppler frequency bin for each segment k that corresponds to the Doppler frequency.

In addition to one or more of the features described herein, the processing device is further configured to determine a phase correction of the extracted components, the phase correction determined based on:

$$\frac{4\pi}{\lambda}\left(\hat{v}_0 kMT + \frac{1}{2}\hat{\alpha}(kMT)^2\right).$$

In addition to one or more of the features described herein, combining the extracted components includes correlating the selected one or more bins with a match filter having a set of synthetic bins, the set of synthetic bins corresponding to the set of hypotheses.

In addition to one or more of the features described herein, the velocity and acceleration spectrum is calculated based on:

$$z(\hat{v}_0, \hat{\alpha}) = \sum_{k=0}^{\frac{N}{M}-1} e^{\frac{4\pi j}{\lambda}\left(\hat{v}_0 kMT + \frac{1}{2}\hat{\alpha}(kMT)^2\right)} y_k(f_D),$$

where $z(\hat{v}_0, \hat{\alpha})$ is the calculated velocity and acceleration spectrum, $\lambda$ is a wavelength, N is a total number of samples in the time frame, and M is a number of samples in each segment k.

In addition to one or more of the features described herein, the extracted components are represented by:

$$y_k(f_D) = \sum_{m=1}^{M} x_{kM+m} \cdot e^{2\pi j f_D mT},$$

where $x_{kM+m}$ is a value of a signal sample that corresponds to an extracted component, and $f_D$ is the Doppler frequency of the extracted component.

In one exemplary embodiment, a method of estimating a parameter of an object includes detecting a return signal including reflections of a radar signal, the radar signal including a series of transmitted pulses emitted over a selected time frame, sampling the return signal over the time frame to generate a series of signal samples, partitioning the time frame into a plurality of successive segments k so that an assumption of a linear phase change within each segment k is valid, and for each segment k, applying a Doppler Fourier transform, and calculating a complex value $y_k$ as a function of a plurality of Doppler frequencies $f_D$. The method also includes selecting a set of hypotheses including an acceleration hypothesis and velocity hypothesis, and performing, for the set of hypotheses, calculating an index based on the acceleration hypothesis and the velocity hypothesis, and for each segment, selecting one or more Doppler frequency bins based on the index, and extracting components of the complex value $y_k$ associated with each selected Doppler frequency. The method further includes combining the extracted components to calculate a velocity and acceleration spectrum for the time frame, and detecting the object and estimating an object parameter based on the velocity and acceleration spectrum.

In addition to one or more of the features described herein, the object parameter includes at least one of an object position, an object velocity and an object acceleration.

In addition to one or more of the features described herein, the object is detected based on an intensity of the velocity and acceleration spectrum exceeding a selected threshold.

In addition to one or more of the features described herein, the method further includes selecting a plurality of sets of hypotheses, each set of hypotheses having a respective velocity hypothesis and a respective acceleration hypothesis.

In addition to one or more of the features described herein, the method further includes calculating a respective index for each set of hypotheses, generating a velocity and acceleration spectrum for each set of hypotheses based on the respective index, and estimating a velocity and acceleration of the object by comparing intensities of each respective velocity and acceleration spectrum, and selecting at least one of the velocity and acceleration spectra based on the comparing.

In addition to one or more of the features described herein, the set of hypotheses includes an initial velocity hypothesis $\hat{v}_0$ and an acceleration hypothesis $\hat{\alpha}$, and calculating the index includes calculating a velocity value for each segment k based on:

$$\tilde{v} = \hat{v}_0 + \hat{\alpha} kMT,$$

where $\tilde{v}$ is the Doppler index, M is a number of samples in each segment k, and T is a sampling interval, converting the velocity value for each segment k to a Doppler frequency based on:

$$f_D = \frac{2\tilde{v}}{\lambda},$$

where $\lambda$ is a wavelength, and selecting at least one Doppler frequency bin for each segment k that corresponds to the Doppler frequency.

In addition to one or more of the features described herein, the method further includes determining a phase correction of the extracted components, the phase correction determined based on:

$$\frac{4\pi}{\lambda}\left(\hat{v}_0 kMT + \frac{1}{2}\hat{\alpha}(kMT)^2\right).$$

In addition to one or more of the features described herein, combining the extracted components includes correlating the selected one or more bins with a match filter having a set of synthetic bins, the set of synthetic bins corresponding to the set of hypotheses.

In addition to one or more of the features described herein, the velocity and acceleration spectrum is calculated based on:

$$z(\hat{v}_0, \hat{\alpha}) = \sum_{k=0}^{\frac{N}{M}-1} e^{\frac{4\pi j}{\lambda}\left(\hat{v}_0 kMT + \frac{1}{2}\hat{\alpha}(kMT)^2\right)} y_k(f_D),$$

where $z(\hat{v}_0, \hat{\alpha})$ is the calculated velocity and acceleration spectrum, $\lambda$ is a wavelength, N is a total number of samples in the time frame, and M is a number of samples in each segment k.

In addition to one or more of the features described herein, the extracted components are represented by:

$$y_k(f_D) = \sum_{m=1}^{M} x_{kM+m} \cdot e^{2\pi j f_D mT},$$

where $x_{kM+m}$ is a value of a signal sample that corresponds to an extracted component, and $f_D$ is the Doppler frequency of the extracted component.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 6 depicts an example of a Doppler frequency signal generated by a conventional radar processing technique;

FIG. 7 depicts an example of a Doppler frequency signal generated in accordance with an exemplary embodiment; and FIG. 8 depicts an example of a Doppler range-frequency map generated according to an exemplary embodiment, and a Doppler range-frequency map produced by a conventional radar processing technique.

DETAILED DESCRIPTION

Figure 1:
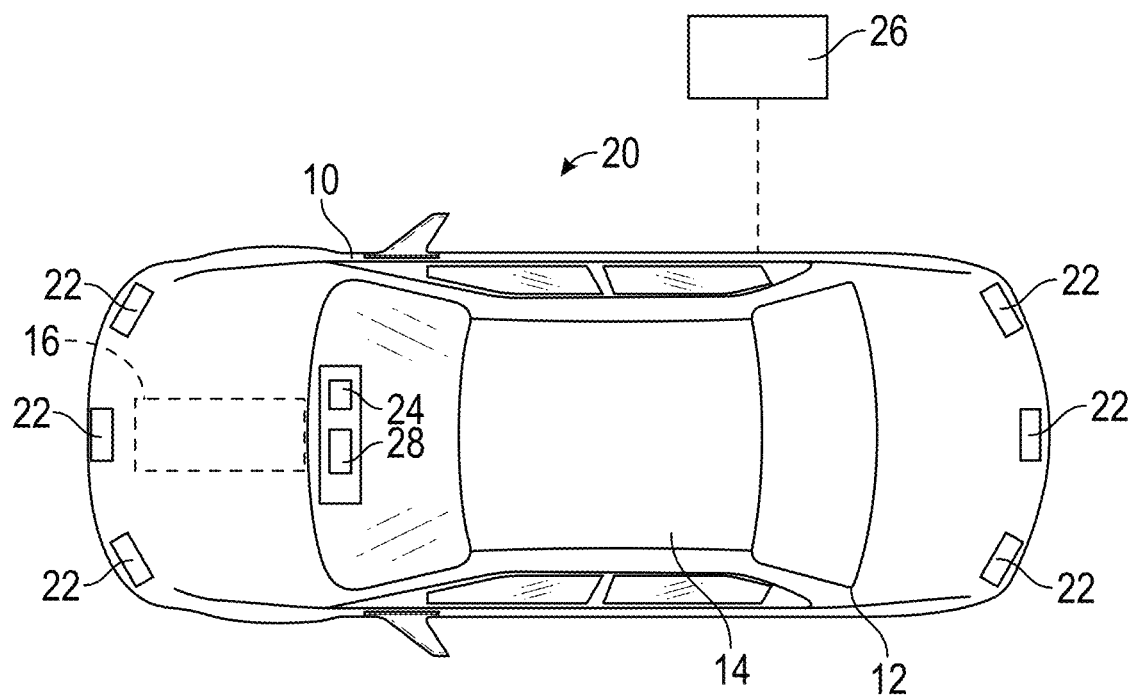
FIG. 1 is a top view of a motor vehicle including a radar system.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods and systems for radar detection and object parameter estimation are described herein. An embodiment of a radar system is configured to estimate a parameter or parameters of an object, such as position, acceleration and/or velocity. An object may be any feature or condition that reflects transmitted radar signals (e.g., vehicles, people, ships, weather phenomena, etc.). The radar system may be included in or connected to a vehicle for detection of objects such as road features, road obstructions, other vehicles, trees, people and others. The radar system is not limited to use with vehicles, and may be used in any context (e.g., weather, aviation and others).

The radar system includes or is in communication with a processor configured to perform a method of detecting a dynamic vehicle or other object during acceleration of the object, and accurately estimating object parameters such as velocity and acceleration. The method includes partitioning a frame (e.g., a coherent processing frame) into a plurality of successive time segments and performing a Doppler signal processing technique on return signal components (e.g., samples) in each segment. The segments are selected under an approximation or assumption of constant velocity in each segment (i.e., so that an approximation of linear phase change within a segment is valid).

Doppler processing is performed on samples in each segment to transform the time domain return signal into the frequency domain. For each segment, an output of the Doppler processing is generated that includes amplitudes for each of a plurality of Doppler frequencies. For example, a discrete Fourier transform (DFT) is performed on the samples in an initial segment, and a DFT is performed individually for each segment. For each segment, components of the DFT output are stored in or associated with one or more Doppler frequency bins. A "bin," in an embodiment, represents a frequency value or range within a frequency spectrum. As discussed below, a matrix can be generated that includes columns corresponding to segments of a time frame, and rows corresponding to frequency bins.

The Doppler processing outputs are then efficiently combined to estimate parameters including the velocity and acceleration of the object. Other parameters may be estimated, such as location, distance and/or azimuth.

In an embodiment, one or more sets of a velocity hypothesis and an acceleration hypothesis are selected. For each set of hypotheses, a velocity or frequency index (also referred to as a Doppler index) is calculated for each segment based on the velocity and acceleration selected for the set. The index instructs the processor as to which bin or bins in each segment are to be selected when combining DFT outputs. For a given segment, a single bin or a set of multiple bins is selected (e.g., if the Doppler index falls between adjacent bins). Based on the index, for a given set of hypotheses, DFT components for each segment are extracted from bins, and the selected components are integrated or otherwise combined to generate a combined velocity and acceleration spectrum. If the combined spectrum has a peak exceeding some threshold, an object is detected, and the object velocity and acceleration are determined.

In an embodiment, a plurality of sets of hypotheses are selected, each having a different combination of a velocity hypothesis and an acceleration hypothesis. For example, each set includes an initial velocity (velocity at the earliest segment) hypothesis and a different acceleration hypothesis.

For each set of hypotheses, the Doppler index is calculated and DFT output components or bins are selected according to the Doppler index. The Doppler index can be expressed as one or more values, an equation, a slope or in any other suitable manner.

The selected components are summed, integrated or otherwise combined to generate a combined velocity and acceleration spectrum for each set of hypotheses. The combined spectrum includes intensity values for each Doppler frequency. The process is repeated to generate a velocity and acceleration spectrum for each set of hypotheses, and peaks in the spectrum are identified to determine which set of hypotheses produces peaks with enough intensity to identify an object. The process thereby provides an indication as to the actual object velocity and acceleration.

Embodiments described herein present numerous advantages. For example, a radar system configured according to embodiments described herein can accurately estimate parameters (e.g., position, velocity and/or acceleration) for accelerating and decelerating objects. In addition, the embodiments provide for a more efficient and faster process for detecting objects, as the complexity and needed processing power is significantly reduced as compared to conventional techniques and systems. Embodiments described herein also provide for higher intensity combined signals and lower miss detection probabilities than conventional systems.

FIG. 1 shows an embodiment of a motor vehicle 10, which includes a vehicle body 12 defining, at least in part, an occupant compartment 14. The vehicle body 12 also supports various vehicle subsystems including an engine assembly 16, and other subsystems to support functions of the engine assembly 16 and other vehicle components, such as a braking subsystem, a steering subsystem, a fuel injection subsystem, an exhaust subsystem and others.

The vehicle 10 includes aspects of a radar system 20 for detecting and tracking objects, which can be used to alert a user, perform avoidance maneuvers, assist the user and/or autonomously control the vehicle 10. The radar system 20 includes one or more radar sensing assemblies 22, each of which may include one or more transmit elements and/or one or more receive elements. The vehicle 10 may incorporate a plurality of radar sensing assemblies disposed at various locations and having various angular directions.

For example, each radar sensing assembly 22 includes a transmit portion and a receive portion. The transmit and receive portions may include separate transmit and receive antennas or share an antenna in a transceiver configuration. Each radar sensing assembly 22 may include additional components, such as a low pass filter (LPF) and/or a controller or other processing device. The radar sensing assembly and/or radar system 20 may be configured as a coherent radar.

The radar sensing assemblies 22 communicate with one or more processing devices, such as processing devices in each assembly and/or a remote processing device such as an on-board processor 24 and/or a remote processor 26. The remote processor 26 may be part of, for example, a mapping system or vehicle diagnostic system. The vehicle 10 may also include a user interaction system 28 and other components such as a GPS device.

The radar system 20 is configured generally to acquire radar signals and analyze the radar signals to estimate a parameter of an object, such as position, acceleration and/or a velocity of the object. Such parameters are typically estimated by processing and integrating acquired signals over a selected time frame. The length of the time frame is selected to provide for a desired resolution.

The radar system 20 is configured to transmit radar signals from one or more transmitters, each of which includes a series of successive pulses transmitted over a selected time frame. In an embodiment, the selected time frame is selected as a coherent processing interval associated with coherent radar techniques. Reflections of the transmitted pulses are detected by a receiver and multiplied or mixed with a reference signal (e.g., a waveform corresponding to the transmitted radar signal) to generate a return signal.

Figure 2:
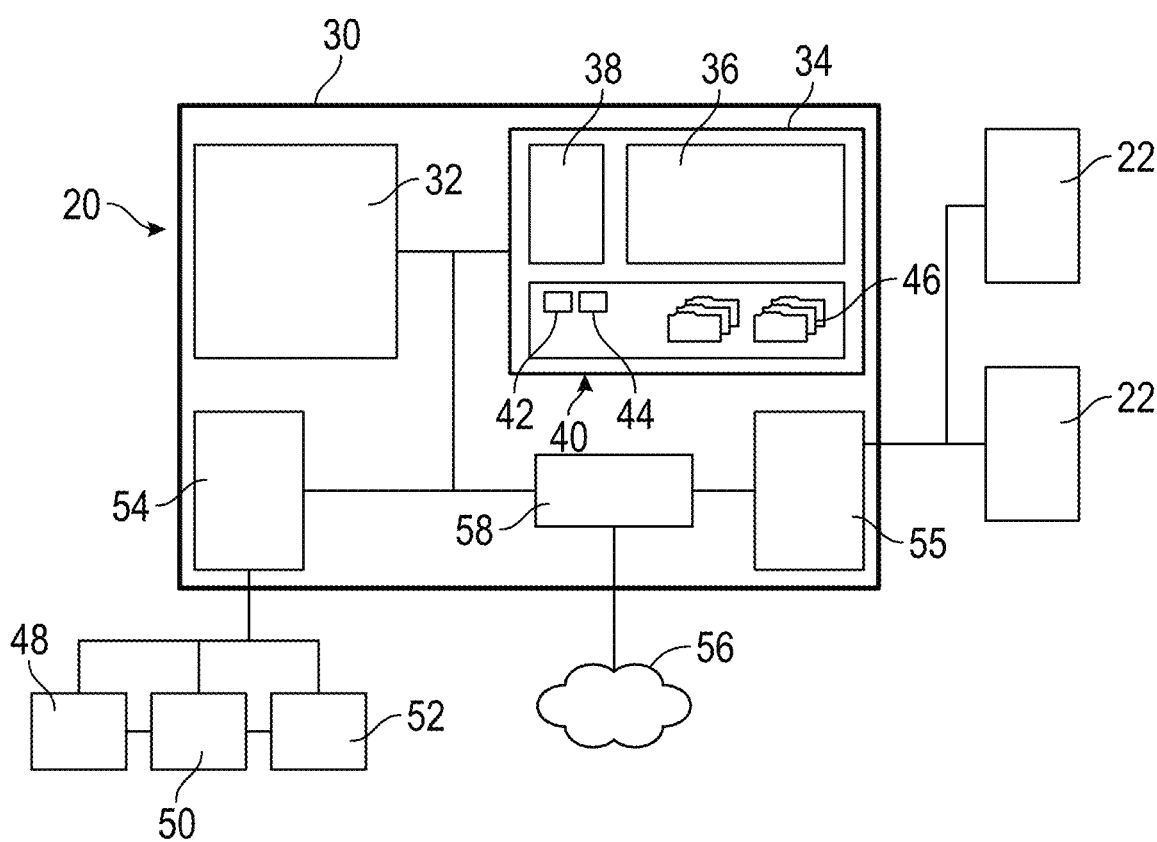
FIG. 2 depicts a radar system, in accordance with an exemplary embodiment.

FIG. 2 illustrates aspects of an embodiment of a computer system 30 that is in communication with or is part of the radar system 20, and that can perform various aspects of embodiments described herein. The computer system 30 includes at least one processing device 32, which generally includes one or more processors for performing aspects of radar detection and analysis methods described herein. The processing device 32 can be integrated into the vehicle 10, for example, as the on-board processor 24, or can be a processing device separate from the vehicle 10, such as a server, a personal computer or a mobile device (e.g., a smartphone or tablet). For example, the processing device 32 can be part of, or in communication with, one or more engine control units (ECU), one or more vehicle control modules, a cloud computing device, a vehicle satellite communication system and/or others. The processing device 32 may be configured to perform radar detection and analysis methods described herein, and may also perform functions related to control of various vehicle subsystems.

Components of the computer system 30 include the processing device 32 (such as one or more processors or processing units) and a system memory 34. The system memory 34 may include a variety of computer system readable media. Such media can be any available media that is accessible by the processing device 32, and includes both volatile and non-volatile media, removable and non-removable media.

For example, the system memory 34 includes a non-volatile memory 36 such as a hard drive, and may also include a volatile memory 38, such as random access memory (RAM) and/or cache memory. The computer system 30 can further include other removable or non-removable, and volatile or non-volatile computer system storage media.

The system memory 34 can include at least one program product having a set (e.g., at least one) of program modules that are configured to carry out functions of the embodiments described herein. For example, the system memory 34 stores various program modules 40 that generally carry out the functions and/or methodologies of embodiments described herein. For example, a receiver module 42 may be included to perform functions related to acquiring and processing received signals (e.g., radar return signals), and an analysis module 44 may be included to perform functions related to object detection and estimation of object parameters (e.g., velocity, acceleration and/or position). The system memory 34 may also store various data structures 46, such as data files or other structures that store data related to radar detection and analysis. Examples of such data include sampled return signals, frequency data, range-Doppler plots and spectra, and object position, velocity and/or azimuth data. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 32 may communicate with the radar sensing assemblies 22 via, for example, an Input/Output (I/O) interfaces 55. The processing device 32 may also communicate with one or more external devices 48 such as a keyboard, a pointing device, and/or any devices (e.g., network card, modem, etc.) that enable the processing device 32 to communicate with one or more other computing devices. In addition, the processing device 32 can communicate with one or more devices that may be used in conjunction with the radar system 20, such as a Global Positioning System (GPS) device 50 and a camera 52.

The GPS device 50 and the camera 52 can be used, for example, in combination with the radar system 20 for autonomous and/or semi-autonomous control of the vehicle 10. Communication with various devices can occur via I/O interfaces 54.

The processing device 32 may also communicate with one or more networks 56 such as a local area network (LAN), a general wide area network (WAN), and/or a public network (e.g., the Internet) via a network adapter 58. It should be understood that although not shown, other hardware and/or software components could be used in conjunction with the computer system 30. Examples include, but are not limited to: microcode, device drivers, redundant processing units, external disk drive arrays, RAID systems, and data archival storage systems, etc.

Figure 3:
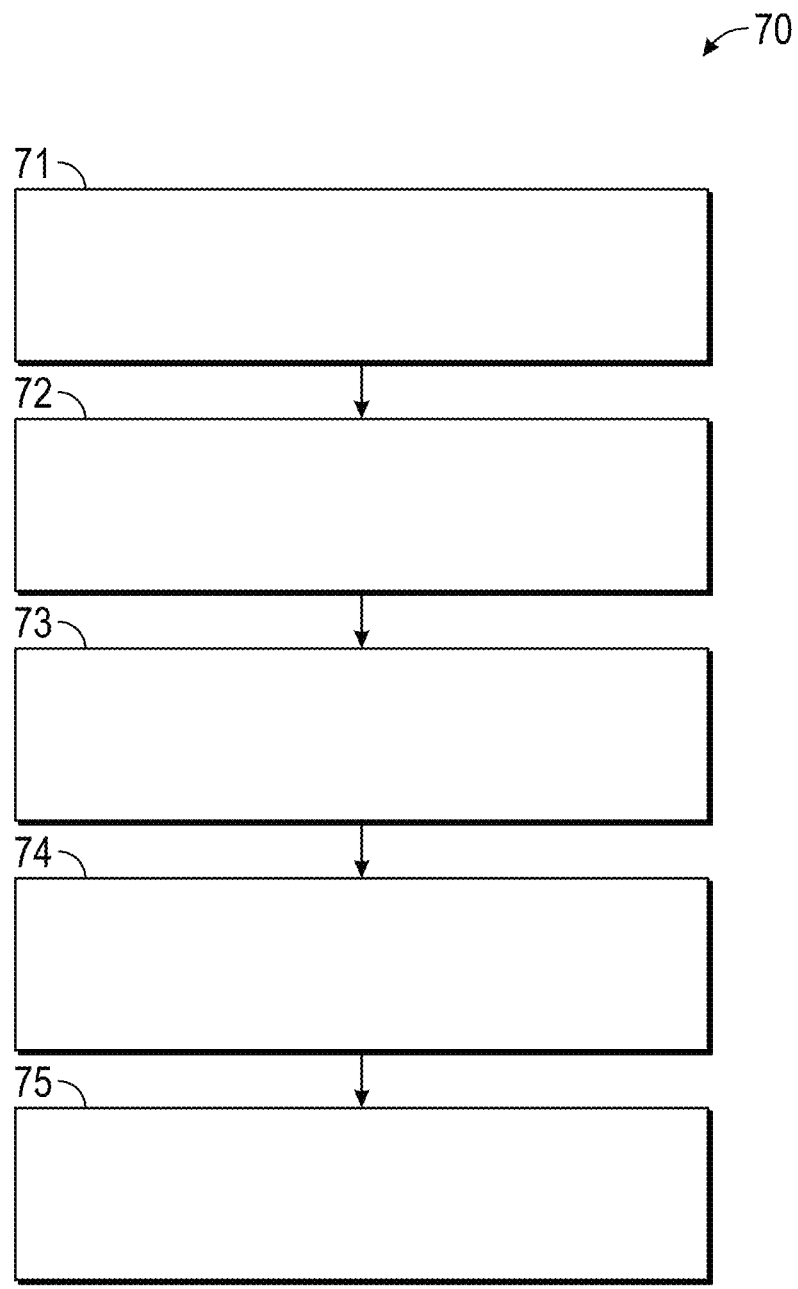
FIG. 3 is a flowchart depicting a method of estimating one or more parameters of an object using a radar system, in accordance with an exemplary embodiment.

FIG. 3 illustrates aspects of an embodiment of a computer-implemented method 70 of radar detection and analysis, which includes estimating a parameter of an object, such as location or position, acceleration and/or velocity. The method 70 may be performed by a processor or processors disposed in a vehicle (e.g., the processing device 32, as an ECU or on-board computer) and/or disposed in a device such as a smartphone, tablet or smartwatch. The method 70 is discussed in conjunction with the radar system 20 of FIG. 1 and components shown in FIG. 2 for illustration purposes. It is noted that aspects of the method 70 may be performed by any suitable processing device or system, exclusively or in conjunction with a human operator.

The method 70 includes a plurality of stages or steps represented by blocks 71-75, all of which can be performed sequentially. However, in some embodiments, one or more of the stages can be performed in a different order than that shown or fewer than the stages shown may be performed.

At block 71, a radar signal is transmitted by one or more transmit elements in a radar system, such as the radar system 20. Each transmit element transmits radar signals having a series of pulses. In one embodiment, each transmit element transmits a linear frequency-modulated continuous wave (LFM-CW) signal. This signal may be referred to as a "chirp signal," and each pulse may be referred to as a "chirp."

Each radar signal is emitted over the course of a selected time frame. The time frame may be of any suitable length. In an embodiment, the time frame is selected to be equal to, or related to, a coherent processing interval (CPI). Although only one transmit element and one radar signal (the duration of which is equal to the selected time frame) is discussed herein, it is to be understood that the method 70 is applicable to multiple radar signals, from a single transmit element or multiple transmit elements.

For example, the method 70 may be performed as part of a multiple-input multiple-output (MIMO) and/or phased array radar system that includes multiple transmitters. Performance of the method 70 in this example may include individually processing and analyzing each received return signal associated with each transmitter.

A return signal is detected or measured by one or more receive elements as a measurement signal. For example, analog signals detected by the receive element(s) are sampled and converted to digital signals, referred to herein as samples. In an embodiment, return signals are sampled over a selected time frame (having a duration equal to the selected time frame during which a radar signal is emitted) according to a selected sampling frequency, and a detected signal $x_n$ is produced for each of a number of samples n. The total number of samples n within a given time frame is denoted as N.

At block 72, the time frame is segmented into a plurality of successive time segments k. The segments k, in an embodiment, are of equal temporal length (duration) and are selected such that the phase change in a return signal within a segment k can be validly approximated as linear, and that the velocity can be approximated as constant.

At block 73, a Doppler Fourier transform is applied to the portion of the return signal $x_n$ in each segment k. A time domain signal in a segment is transformed into the Doppler frequency domain by applying a Doppler Fourier transform to the signal. In an embodiment, a discrete Fourier transform (DFT) is performed on the samples in a segment k, producing a DFT output. Performance of a DFT includes calculation of a complex value including amplitude (A) and phase ($\phi$) for each of a plurality of Doppler frequency shifts (referred to herein as Doppler frequencies $f_D$). As discussed further below, Doppler frequencies can be represented as Doppler frequency bins, or $f_D$ bins. For example, for a given segment k, a number of $f_D$ bins are provided, each corresponding to a different Doppler frequency $f_D$.

For example, the processor performs a DFT on samples in each segment k. A DFT output for a given time segment can be represented by a complex signal $y_k(f_D)$ including amplitude and phase information, which is a function of Doppler frequency $f_D$ (a single frequency value or range of frequency values).

At block 74, one or more sets of hypotheses are selected, where each set of hypotheses includes a combination of a velocity hypothesis $\hat{v}$ and an acceleration hypothesis $\hat{\alpha}$. A plurality of sets of hypotheses may be selected. For example, the processor selects or receives at least one initial velocity hypothesis $\hat{v}_0$ and a plurality of acceleration hypotheses $\hat{\alpha}$. For each acceleration hypothesis $\hat{\alpha}$, a set of values ($\hat{v}_0, \hat{\alpha}$) may be defined, each having the initial velocity hypothesis and a different acceleration hypothesis.

The processor calculates a Doppler index for each set of hypotheses ($\hat{v}_0, \hat{\alpha}$), which is based on the velocity hypothesis $\hat{v}$ and the acceleration hypotheses $\hat{\alpha}$ in a set. The Doppler index indicates which components of the DFT outputs are to be selected for a given segment k. An individual Doppler index is calculated for each set of hypotheses. The Doppler index provides a set of individual indexes for each time frame segment. Each individual index indicates which $f_D$ bin (or bins) is selected for the segment associated with the individual index.

The processor then extracts the selected components of the DFT output $y_k(f_D)$ for each segment k for further processing or analysis based on the Doppler index. Unlike prior art techniques that assume a constant velocity or linear phase change along the frame (and thereby assume no acceleration during the frame), the embodiments described herein do not assume a constant velocity, but instead consider that the object can be accelerating. In addition, by selecting only a subset (a $f_D$ bin) of the DFT output in each segment, the number of samples that need be processed is significantly reduced.

The Doppler index may be expressed as a series or vector of velocity or Doppler frequency values (e.g., Doppler frequency amplitudes), where each velocity or Doppler frequency value corresponds to a segment k (also referred to as a segment index). For example, the Doppler index can be configured to indicate a specific Doppler frequency or frequencies for each segment, or indicate a specific Doppler frequency bin or bins for each segment. The index instructs the processor as to which Doppler frequency bin or bins are to be extracted for each segment. In another example, the index is expressed as a slope or other information indicating which Doppler frequency bins are to be selected for each segment k when combining or otherwise processing the DFT outputs in a frame.

At block 75, one or more parameters (e.g., velocity and acceleration) of the object are estimated based on the DFT outputs and the Doppler index. For a given set of hypotheses, a subset of the DFT outputs is extracted based on the Doppler index and the subset is processed by combining the DFT outputs to estimate a velocity, acceleration and/or other property of the object during the time frame. For example, the subset (DFT output components extracted according to the Doppler index) is combined to generate a velocity and acceleration spectrum, such as a range-frequency map. In an embodiment, a velocity and acceleration spectrum is generated for each set of hypotheses, and the spectrum having the highest peaks (exceeding a detection threshold, for example) is selected. The hypothesized velocity and acceleration associated with the selected Doppler frequency is considered to be related to the actual velocity and acceleration of an object.

Figure 4:
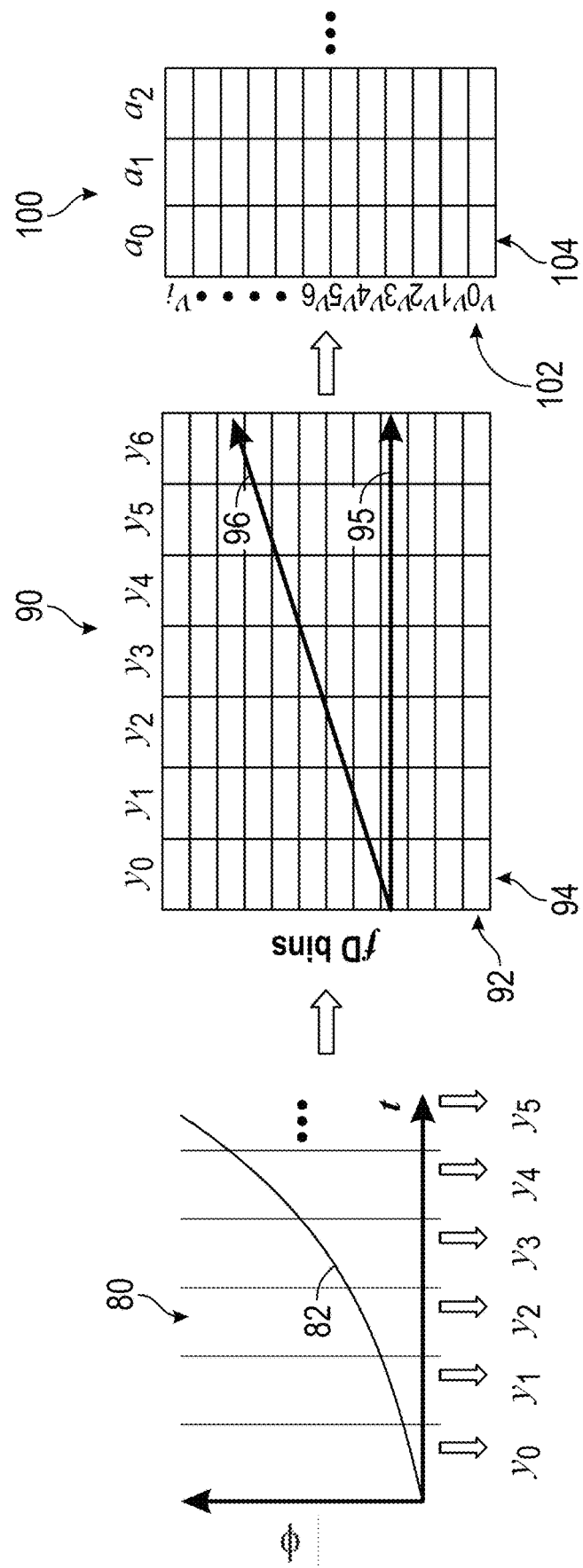
FIG. 4 depicts an example of a radar transmission and detection time frame, and an example of data structures used to detect and estimate parameters of an object, in accordance with an exemplary embodiment.

FIG. 4 depicts an example of various data structures that can be used or generated as part of the method 70. In this example, radar signals are transmitted and reflected from an object or objects as return signals. The radar signals are transmitted, and the return signals are sampled, over a time frame selected as a coherent processing time frame (e.g., about 50 ms). The time frame is represented by a horizontal time (t) axis of a graph 80. If the object is accelerating, the phase of the sampled signals is not linear, as demonstrated by a phase curve 82.

The time frame is divided into a number of segments k, each segment having a duration T that is selected so that the phase can be approximated as linear within the segment. In this example, a number of equal length segments k are selected, and the return signal samples n are subdivided into successive subsets.

In each segment k, samples are transformed into the frequency domain using a DFT, and a DFT output is generated that includes amplitudes and phase intensities at various Doppler frequencies $f_D$. In this example, the DFT output for a segment k is a vector $y_k$ that includes complex values for each Doppler frequency $f_D$.

Components of the DFT outputs are stored in or assigned to a matrix 90 that includes rows 92, and a number K of columns 94, where each column 94 corresponds to a time frame segment k. Rows 92 represent successive Doppler frequency $f_D$ bins.

For a given segment, the DFT output $y_k$ (a complex value) is scanned along a column 94, and components of the DFT output that correspond to different Doppler frequencies are assigned to corresponding $f_D$ bins. For example, each DFT output includes or represents one or more peaks representing reflections from one object. If a DFT output has multiple peaks (e.g., due to multiple objects), it may be assigned to multiple $f_D$ bins.

FIG. 4 shows an example of a Doppler index calculated for a given set of hypotheses. In this example, a set of hypotheses $(\hat{v}_0, \hat{\alpha})$ is selected that includes an initial velocity hypothesis $\hat{v}_0$ of 10 m/s and an acceleration hypothesis $\hat{\alpha}$ of 0.1 m/s$^2$. The Doppler index is represented in this example by $\hat{v}$, which can be calculated based on the following equation:

$$\hat{v} = \hat{v}_0 + \hat{\alpha} k MT, \quad (1)$$

where M is the number of samples in a segment (i.e., the number of DFT input samples in a segment). T is the sample interval (time between two samples), and k is the segment index. Although the index is defined above as a function of velocity, the index can also be expressed in terms of Doppler frequency or Doppler frequency bin number.

The Doppler index calculated over the time frame is shown in FIG. 4 as a linear function represented by diagonal line 96, which intersects a number of $f_D$ bins. Based on this index, one or more $f_D$ bins are selected. For example, for a given segment, a processor uses the index to identify which $f_D$ bin(s) is/are indicated by the index (i.e., intersected by the diagonal line 96). The identified $f_D$ bins are extracted and the DFT output components stored therein are combined to estimate object parameters.

In some cases, the Doppler index falls in between $f_D$ bins or are within some proximity to an adjacent $f_D$ bin. In some cases, the value of the Doppler index at a segment k can be rounded up or down (i.e., moved to the next bin above or below), or adjusted in any other suitable manner, such as by linear interpolation.

For example, a set of hypotheses $(\hat{v}_0, \hat{\alpha})$ is selected and the Doppler index is calculated for an initial segment (k=zero) using the equation (1). The Doppler index thus corresponds to to the initial velocity. The initial velocity can be correlated with a frequency (f), and the $f_D$ bin corresponding to the frequency is selected. For the next successive segment (k=1), the Doppler index is calculated according to equation (1) with k=1 to obtain the radial velocity and select the corresponding $f_D$ bin. This process is repeated for each successive segment.

For each set of hypotheses, the DFT bins identified by the index are extracted, and the signal components therefrom are combined to derive velocity and acceleration information. Due to the Doppler index, the number of calculations is reduced as compared to conventional techniques that utilize all the samples in each segment, which results in a process that is faster and less complex than conventional techniques. For example, for a given velocity and acceleration hypothesis $(\hat{v}_0, \hat{\alpha})$, one bin from each of K segments is selected, which corresponds to a complexity of K. In contrast, conventional techniques include calculation of all the input samples (M samples per segment) per each hypothesis of velocity and acceleration. The complexity of such conventional techniques is K*M, which has a complexity that is M times higher than that of methods described herein.

Once the selected bins are extracted, the DFT output components are combined for each set of hypotheses $(\hat{v}_0, \hat{\alpha})$ to generate coherently combined amplitudes and phase. For example, the DFT output components are combined using the following summation:

$$z_{v,a} = \sum_{k=0}^{K-1} y_k (g(\hat{v}_0, \hat{a})) e^{j\phi_k^{v,a}}, \quad (2)$$

where K is the number of segments k, $g(\hat{v}_0, \hat{\alpha})$ is a function representing the Doppler index, and $e^{j\phi_k^{v,a}}$ is the phase correction. $z_{v,a}$ represents the summation of the selected $f_D$ bins, where the $f_D$ bins are selected according to the Doppler index. The output from this summation is a relatively high intensity signal for the case that the velocity and acceleration hypothesis are of a real object, and low intensity when the hypothesis corresponds to a non-existing object (i.e., intensities of various frequencies are higher than those of individual samples or sample blocks).

In an embodiment, the extracted DFT bins are input to a match filter, which outputs an intensity value for each velocity and acceleration hypothesis. The output is assigned to or stored in a match filter output matrix 100, which includes rows 102 representing velocity hypotheses and columns 104 representing acceleration hypotheses.

Still referring to FIG. 4, the Doppler index calculation may be repeated for a plurality of acceleration and velocity hypotheses. Another example of a set of hypotheses, which includes an initial velocity hypothesis of 10 m/s and an acceleration hypothesis of zero m/s$^2$, is represented by line 95.

Figure 5:
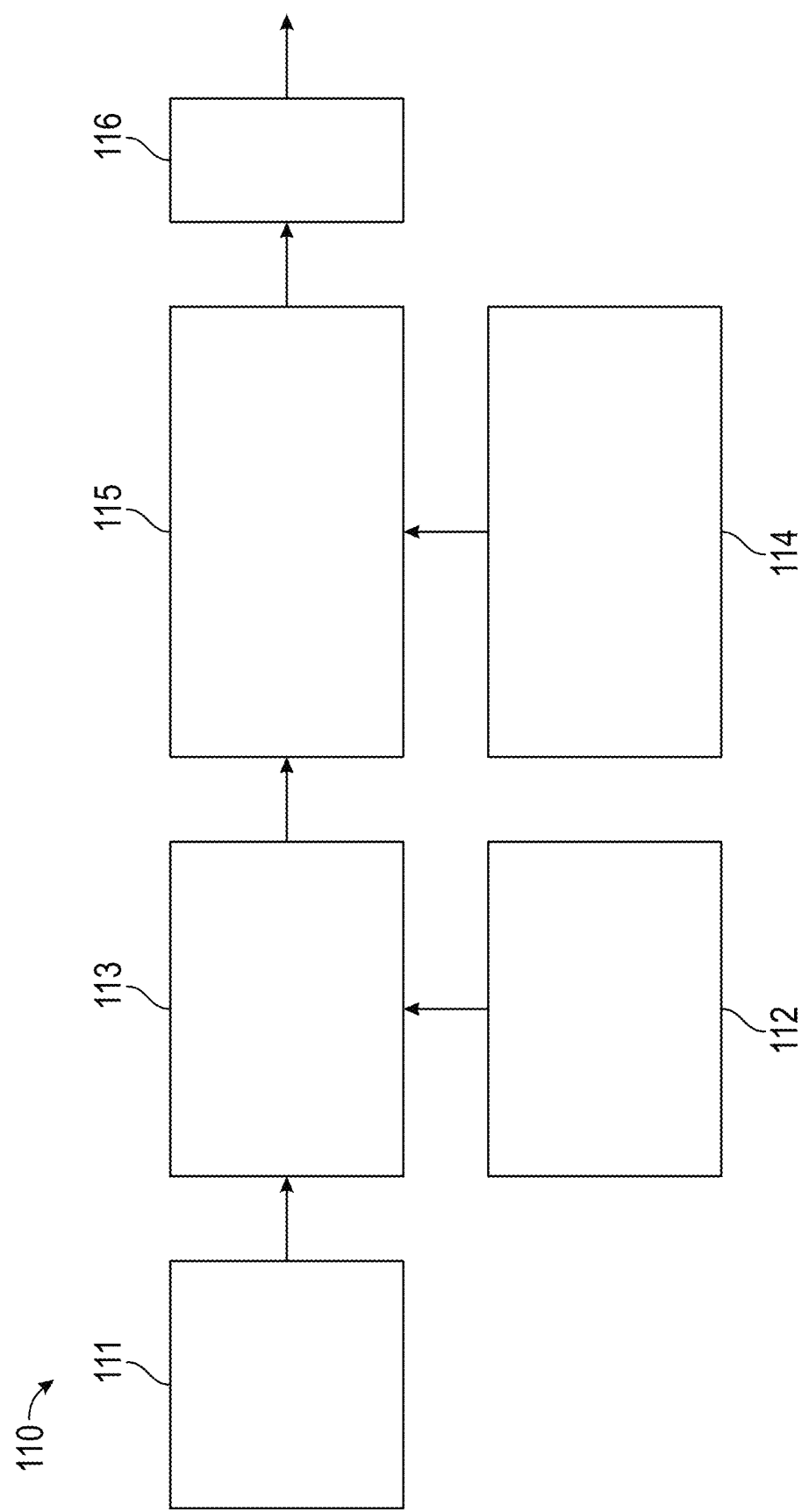
FIG. 5 is a flowchart depicting an example of the method of FIG. 3, in accordance with an exemplary embodiment.

FIG. 5 is a flow diagram showing an example of a method 110 of estimating object parameters for a given set of hypotheses $(\hat{v}_0, \hat{\alpha})$, which may be performed using the matrices of FIG. 4, but is not so limited. The method 110 includes a plurality of stages or steps represented by blocks 111-116, all of which can be performed sequentially. However, in some embodiments, one or more of the stages can be performed in a different order than that shown or fewer than the stages shown may be performed.

Initially, a radar signal is emitted over a selected time frame, and return signals are sampled according to desired sampling frequency and a sampling interval T to generate a plurality of samples n. The time frame is segmented into segments k.

At block 111, each set of M samples is transformed using a DFT, resulting in a DFT output. Components of the DFT outputs (amplitudes and phases of individual Doppler frequencies) are assigned to corresponding $f_D$ bins (e.g., a DFT component having a given frequency is assigned to a bin corresponding to the frequency).

At block 112, a set of hypotheses $(\hat{v}_0, \hat{\alpha})$ is selected and a Doppler index $\tilde{v}$ is calculated for each of the K segments, for example, using equation (1). The Doppler index may be expressed as a velocity, frequency, $f_D$ bin or other value that allows the processor to determine which $f_D$ bin(s) should be selected for each segment k.

At block 113, a $f_D$ bin (or bins) is are selected for each segment based on the Doppler index, and DFT components are extracted from the selected $f_D$ bins. For example, referring to FIG. 4, at least one $f_D$ bin is extracted from each column 94 of the matrix 90 based on the Doppler index, i.e., $f_D$ bins intersected by the diagonal line 96 are selected and DFT output components are extracted from the selected bins.

At block 114, a phase correction is calculated for each set of samples, based on the phase at the beginning of the set of samples. The phase correction can be calculated as:

$$\frac{4\pi}{\lambda}\left(\hat{v}_0 kMT + \frac{1}{2}\hat{a}(kMT)^2\right). \quad (3)$$

In equation (3), M is the number of samples in a segment, k is the segment index, and T is the sampling interval. The phase correction is incorporated into a match filter as discussed at block 115.

At block 115, the phase correction is applied and the sets of samples are integrated using, for example, coherent integration. In an embodiment, the sets of samples are input to a match filter. The match filter provides a set of synthetic bins, which are values that are expected to be calculated if the set of hypotheses corresponds to an actual object velocity and acceleration. The synthetic bins may be represented by the exponential term of equation (8). The match filter outputs values or peaks, which are compared to a threshold value to determine whether the set of hypotheses correspond to actual object velocity and acceleration.

The DFT processing (e.g., match filtering) produces a complex vector z for each bin (i.e., each combination of velocity and acceleration hypotheses). The amplitude (real part) is taken from the vector z and input or assigned, for example to a corresponding velocity and acceleration (v,α) bin in the matrix 100.

An example of a suitable match filter is represented for example, by:

$$z(\hat{v}_0, \hat{a}) = \sum_{n=1}^{N} x_n e^{\frac{4\pi j}{\lambda}\left(\hat{v}_0 nT + \frac{1}{2}\hat{a}(nT)^2\right)}, \quad (4)$$

where $x_n$ are signal amplitudes for samples n. Conventionally, the use of such a match filter requires processing all of the samples n in a frame. By using the index, a subset of the samples are selected based on the Doppler index for a given set of hypotheses, and processed to derive a velocity and acceleration spectrum as follows:

$$z(\hat{v}_0, \hat{a}) = \sum_{k=0}^{\frac{N}{M}-1} \sum_{m=1}^{M} x_{kM+m} \cdot e^{\frac{4\pi j}{\lambda}\left(\hat{v}_0(kM+m)T + \frac{1}{2}\hat{a}[(kM+m)T]^2\right)}, \quad (5)$$

where M is a number of samples in each one of the K segments. Equation (5) can be rewritten as:

$$z(\hat{v}_0, \hat{a}) = \sum_{k=0}^{\frac{N}{M}-1} \sum_{m=1}^{M} x_{kM+m} \cdot e^{\frac{4\pi j}{\lambda}\left(\hat{v}_0 kMT + \frac{1}{2}\hat{a}(kMT)^2 + (\hat{v}_0 + \hat{a}kMT)mT + \frac{1}{2}\hat{a}(mT)^2\right)}. \quad (6)$$

Because the phase is assumed to be linear in each segment k, the term $$\frac{1}{2}\hat{a}(mT)^2,$$

which represents non-linear phase change, is assumed to be small and can be disregarded. This reduces equation (6) to:

$$z(\hat{v}_0, \hat{a}) = \sum_{k=0}^{\frac{N}{M}-1} \left[ e^{\frac{4\pi j}{\lambda}\left(\hat{v}_0 kMT + \frac{1}{2}\hat{a}(kMT)^2\right)} \sum_{m=1}^{M} x_{kM+m} \cdot e^{\frac{4\pi j}{\lambda}(\hat{v}_0 + \hat{a}kMT)mT} \right]. \quad (7)$$

The above equation can be further reduced by substituting the summation of M samples with a function of the Doppler index of equation (1), resulting in:

$$z(\hat{v}_0, \hat{a}) = \sum_{k=0}^{\frac{N}{M}-1} e^{\frac{4\pi j}{\lambda}\left(\hat{v}_0 kMT + \frac{1}{2}\hat{a}(kMT)^2\right)} y_k(\tilde{v}), \quad (8)$$

where:

$$y_k(\tilde{v}) = \sum_{m=1}^{M} x_{kM+m} \cdot e^{\frac{4\pi j}{\lambda}\tilde{v}mT}. \quad (9)$$

The above represents the DFT components selected based on the Doppler index $\tilde{v}$, which is defined in equation (1) in terms of velocity. This can be converted to Doppler frequency $f_D$ using the relationship $f_D=(2\tilde{v})/\lambda$, resulting in:

$$y_k(f_D) = \sum_{m=1}^{M} x_{kM+m} \cdot e^{2\pi j f_D mT} = X_k(f_D), \quad (10)$$

where $X_{kM+m}$ is the DFT output of the k-th set of samples. $X_k$ can be represented as:

$$X_k = DFT\{x_{kM+1} \ldots x_{kM+m}\}.$$

The output z is a coherent combination of the intensity values in each selected $f_D$ bin, and is represented by:

$$z(\hat{v}_0, \hat{a}) = \sum_{k=0}^{\frac{N}{M}-1} e^{\frac{4\pi j}{\lambda}\left(\hat{v}_0 kMT + \frac{1}{2}\hat{a}(kMT)^2\right)} y_k(f_D)$$

At block 116, the match filter output is analyzed to identify peaks therein. Peaks that exceed a selected detection threshold (e.g., amplitude or intensity threshold) can be identified based on the output to determine an estimated velocity and acceleration. Other parameters such as distance and location can also be derived from the match filter output.

The solution provided by the above described embodiments is significantly less complex than conventional techniques. For example, the complexity O of a conventional solution is expressed as O(N*Nα*Nv), where N is the number of samples in a frame, Nv is the number of velocity (e.g., initial velocity) hypotheses, and Na is the number of acceleration hypotheses.

The complexity of the methods described herein is significantly less than that of conventional techniques. For example, the complexity of the method 70 and method 110 can be expressed as O(N*Nv+M*Nα*Nv)=O(M*Nα*Nv), where M is the number of samples in each segment. The complexity of the above method is significantly improved by a factor of N/M, which is the number of segments. For example, for a 50 ms frame and signal having a frequency of 40 MHz, and a chirp duration of 25 us, the complexity is reduced by a factor of 200. This reduced complexity provides advantages in the form of, e.g., reduced processing power consumption and faster performance.

As noted above, the method described herein produce more intense peaks that improve object detection. The following examples illustrate advantages of Doppler processing according to embodiments described herein. In these examples, there is an accelerating object.

FIG. 6 shows a result of Doppler processing using a conventional technique, in which the velocity is assumed to be constant and the phase change is assumed to be linear (as shown by phase-time curve 200). In this example, the result of this processing is a velocity and acceleration spectrum 202, a first part 204 (return signal component) of the spectrum representing return signals and a second part 206 representing noise and clutter. As can be seen, the intensity of the return signal component is below a detection threshold 208, and no object is detected.

FIG. 7 shows a result of Doppler processing using the method 70 or 110, in which the velocity is not assumed to be constant (the phase change curve 300 is assumed to be non-linear). The result of this processing is a velocity and acceleration spectrum 302 having a return signal component 304 and noise and clutter components 306. As shown, the method described herein results in the return signal component peak that is above the detection threshold 208. As a result, the object is detected.

FIG. 8 shows a comparison between data derived from the methods described herein and data derived from a conventional method in which the object velocity is assumed to be constant during the time frame. In this example, radar detection is performed according to methods described herein, and a range map 400 is generated. The range map 400 is color coded or shaded according to a legend 402, showing an output of the detection method as a function of range and Doppler frequency. FIG. 8 also shows a range map 500 generated according to a conventional process.

As shown, the range map 400 produced by methods described herein results in a high intensity signal that provides a sharp peak in the velocity and acceleration spectrum and a higher gain on target as compared to the velocity and acceleration spectrum shown by the conventionally generated range map 500. The Doppler spectrum peak in the conventionally produced range map 500 has a significantly high spread, resulting in higher uncertainty as to the object velocity as compared to the output of the methods described herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system for estimating a parameter of an object, the system comprising:
   a receiver configured to detect a return signal including reflections of a radar signal, the radar signal including a series of transmitted pulses emitted over a selected time frame; and
   a processing device configured to perform:
   sampling the return signal over the time frame, to generate a series of signal samples;
   partitioning the time frame into a plurality of successive segments k so that an assumption of a linear phase change within each segment k is valid;
   for each segment k, applying a Doppler Fourier transform, and calculating a complex value $y_k$ as a function of a plurality of Doppler frequencies $f_D$;
   selecting a set of hypotheses including an acceleration hypothesis and velocity hypothesis; and
   performing, for the set of hypotheses:
   calculating an index based on the acceleration hypothesis and the velocity hypothesis;
   for each segment, selecting one or more Doppler frequency bins based on the index, and extracting components of the complex value $y_k$ ($f_D$) associated with each selected Doppler frequency bin; and
   combining the extracted components to calculate a velocity and acceleration spectrum for the time frame, and detecting the object and estimating an object parameter based on the velocity and acceleration spectrum.

2. The system of claim 1, wherein the object parameter includes at least one of an object position, an object velocity and an object acceleration.

3. The system of claim 1, wherein the processing device is configured to detect the object based on an intensity of the velocity and acceleration spectrum exceeding a selected threshold.

4. The system of claim 1, wherein the processing device is configured to select a plurality of sets of hypotheses, each set of hypotheses having a respective velocity hypothesis and a respective acceleration hypothesis.

5. The system of claim 4, wherein the processing device is configured to:
   calculate a respective index for each set of hypotheses;
   generate a velocity and acceleration spectrum for each set of hypotheses based on the respective index; and
   estimate a velocity and acceleration of the object by comparing intensities of each respective velocity and acceleration spectrum, and selecting at least one of the velocity and acceleration spectra based on the comparing.

6. The system of claim 1, wherein the set of hypotheses includes an initial velocity hypothesis $\hat{v}_0$ and an acceleration hypothesis $\hat{a}$, and calculating the index includes:
   calculating a velocity value for each segment k based on:

$$\tilde{v} = \hat{v}_0 + \hat{a}kMT,$$

wherein $\tilde{v}$ is the Doppler index, M is a number of samples in each segment k, and T is a sampling interval;
converting the velocity value for each segment k to a Doppler frequency based on:

$$f_D = \frac{2\tilde{v}}{\lambda},$$

wherein $\lambda$ is a wavelength; and
selecting at least one Doppler frequency bin for each segment k that corresponds to the Doppler frequency.

7. The system of claim 6, wherein the processing device is further configured to perform determining a phase correction of the extracted components, the phase correction determined based on:

$$\frac{4\pi}{\lambda}\left(\hat{v}_0 kMT + \frac{1}{2}\hat{a}(kMT)^2\right).$$

8. The system of claim 7, wherein combining the extracted components includes correlating the selected one or more bins with a match filter having a set of synthetic bins, the set of synthetic bins corresponding to the set of hypotheses.

9. The system of claim 8, wherein the velocity and acceleration spectrum is calculated based on:

$$z(\hat{v}_0, \hat{a}) = \sum_{k=0}^{\frac{N}{M}-1} e^{\frac{4\pi j}{\lambda}(\hat{v}_0 kMT + \frac{1}{2}\hat{a}(kMT)^2)} y_k(f_D),$$

wherein $z(\hat{v}_0, \hat{a})$ is the calculated velocity and acceleration spectrum, $\lambda$ is a wavelength, N is a total number of samples in the time frame, and M is a number of samples in each segment k.

10. The system of claim 9, wherein the extracted components are represented by:

$$y_k(f_D) = \sum_{m=1}^{M} x_{kM+m} \cdot e^{2\pi j f_D mT},$$

wherein $x_{kM+m}$ is a value of a signal sample that corresponds to an extracted component, and $f_D$ is the Doppler frequency of the extracted components.

11. A method of estimating a parameter of an object, the method comprising:
  detecting a return signal including reflections of a radar signal, the radar signal including a series of transmitted pulses emitted over a selected time frame;
  sampling the return signal over the time frame, to generate a series of signal samples;
  partitioning the time frame into a plurality of successive segments k so that an assumption of a linear phase change within each segment k is valid;
  for each segment k, applying a Doppler Fourier transform, and calculating a complex value $y_k$ as a function of a plurality of Doppler frequencies $f_D$;
  selecting a set of hypotheses including an acceleration hypothesis and velocity hypothesis; and
  performing, for the set of hypotheses:
    calculating an index based on the acceleration hypothesis and the velocity hypothesis;
    for each segment, selecting one or more Doppler frequency bins based on the index, and extracting components of the complex value $y_k$ associated with each selected Doppler frequency; and
    combining the extracted components to calculate a velocity and acceleration spectrum for the time frame, and detecting the object and estimating an object parameter based on the velocity and acceleration spectrum.

12. The method of claim 11, wherein the object parameter includes at least one of an object position, an object velocity and an object acceleration.

13. The method of claim 11, wherein the object is detected based on an intensity of the velocity and acceleration spectrum exceeding a selected threshold.

14. The method of claim 11, further comprising selecting a plurality of sets of hypotheses, each set of hypotheses having a respective velocity hypothesis and a respective acceleration hypothesis.

15. The method of claim 14, further comprising:
  calculating a respective index for each set of hypotheses;
  generating a velocity and acceleration spectrum for each set of hypotheses based on the respective index; and
  estimating a velocity and acceleration of the object by comparing intensities of each respective velocity and acceleration spectrum, and selecting at least one of the velocity and acceleration spectra based on the comparing.

16. The method of claim 11, wherein the set of hypotheses includes an initial velocity hypothesis $\hat{v}_0$ and an acceleration hypothesis $\hat{a}$, and calculating the index includes:
  calculating a velocity value for each segment k based on:
  $$\tilde{v} = \hat{v}_0 + \hat{a} kMT,$$
  wherein $\tilde{v}$ is the Doppler index, M is a number of samples in each segment k, and T is a sampling interval;
  converting the velocity value for each segment k to a Doppler frequency based on:

$$f_D = \frac{2\tilde{v}}{\lambda},$$

wherein $\lambda$ is a wavelength; and
selecting at least one Doppler frequency bin for each segment k that corresponds to the Doppler frequency.

17. The method of claim 16, further comprising determining a phase correction of the extracted components, the phase correction determined based on:

$$\frac{4\pi}{\lambda}\left(\hat{v}_0 kMT + \frac{1}{2}\hat{a}(kMT)^2\right).$$

18. The method of claim 17, wherein combining the extracted components includes correlating the selected one or more bins with a match filter having a set of synthetic bins, the set of synthetic bins corresponding to the set of hypotheses.

19. The method of claim 18, wherein the velocity and acceleration spectrum is calculated based on:

$$z(\tilde{v}_0, \hat{a}) = \sum_{k=0}^{\frac{N}{M}-1} e^{\frac{4\pi j}{\lambda}(\tilde{v}_0 kMT + \frac{1}{2}\hat{a}(kMT)^2)} y_k(f_D),$$

wherein $z(\tilde{v}_0, \hat{a})$ is the calculated velocity and acceleration spectrum, $\lambda$ is a wavelength, N is a total number of samples in the time frame, and M is a number of samples in each segment k.

20. The method of claim 19, wherein the extracted components are represented by:

$$y_k(f_D) = \sum_{m=1}^{M} x_{kM+m} \cdot e^{2\pi j f_D mT},$$

wherein $X_{kM+m}$ is a value of a signal sample that corresponds to an extracted component, and $f_D$ is the Doppler frequency of the extracted components.

* * * * *